United States Patent
Bauer et al.

(10) Patent No.: US 6,848,308 B2
(45) Date of Patent: Feb. 1, 2005

(54) CIRCUIT ARRANGEMENT FOR EVALUATING AN ACCELERATION SENSOR USING THE FERRARIS PRINCIPLE

(75) Inventors: Franz Bauer, Herzogenaurach (DE); Gabriel Daalmans, Hoechstadt (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/918,653

(22) Filed: Jul. 31, 2001

(65) Prior Publication Data

US 2002/0078748 A1 Jun. 27, 2002

(30) Foreign Application Priority Data

Dec. 22, 2000 (DE) .......................................... 100 64 835

(51) Int. Cl.⁷ ............................................. G01P 15/08
(52) U.S. Cl. .................. 73/514.31; 73/514.39
(58) Field of Search ......................... 73/514.31, 514.16, 73/514.38, 1.41

(56) References Cited

U.S. PATENT DOCUMENTS 5,363,706 A * 11/1994 Lew ......................... 73/861.38

FOREIGN PATENT DOCUMENTS

| DE | 19828372 | | 12/1999 |
| DE | 10032143 | * | 5/2001 |
| EP | 0661543 | * | 11/1994 |
| WO | WO 01/23897 | * | 4/2001 |

* cited by examiner

*Primary Examiner*—Helen Kwok
(74) *Attorney, Agent, or Firm*—Baker Botts L.L.P.

(57) ABSTRACT

In order to compensate for a drop in sensitivity at high rotational speeds, an acceleration sensor having an inductive measuring head (T) which cooperates with a moving Ferraris disk (F) essentially over a main magnetic field and which supplies an acceleration-dependent variable (Vdet; Vα) is expanded by an additional DC magnetic field excitation circuit (13, 14, $I_K$, $R_K$) with a means for driving the latter with the effect that the additional DC magnetic field acts in a compensating fashion on an eddy-current DC field, starting from a relatively high rotational speed (ω) of the Ferraris disk (F). This can be performed by amplifying the main magnetic field or by reducing the eddy-current DC field. A control signal (Vω), dependent on rotational speed, which both can be generated outside the sensor via a characteristic curve, and can be derived in the form of a control loop from the sensor signal (Vα), serves as a drive.

16 Claims, 4 Drawing Sheets

CIRCUIT ARRANGEMENT FOR EVALUATING AN ACCELERATION SENSOR USING THE FERRARIS PRINCIPLE

FIELD OF THE INVENTION

The invention relates to a circuit for evaluating an acceleration sensor using the Ferraris principle, having an inductive measuring head which cooperates with a moving Ferraris disk essentially over a main magnetic field and supplies an acceleration-dependent variable.

BACKGROUND OF THE INVENTION

For the detection of changes in speed on drive shafts, the prior art teaches the use, inter alia, of acceleration sensors which operate in accordance with the Ferraris principle or rotary field principle. Such sensors are based on the induction principle and are classed with induction measuring elements.

In accordance with the Ferraris principle, a disk, for example made for aluminum, is used as a conductor which is rotatably mounted and moves in a magnetic field. The magnetic field may also be designated as the main field, to be generated either by a permanent magnet or by an operating coil. The design of such a measuring head surrounding the Ferraris disk will be discussed in more detail below. Movement of the Ferraris disk, for example by coupling to a drive axle, induces currents, in particular eddy currents, in the Ferraris disk which can be evaluated by a detector coil and provide a variable, proportional to the acceleration of the Ferraris disk.

In practice, the solutions for evaluating such an acceleration sensor using the Ferraris principle in accordance with the prior art exhibit substantial drawbacks. For example, the sensitivity of the sensor drops sharply in the case of a high rotational speed of the Ferraris disk. The illustration according to FIG. 1 shows a diagram in this respect in which the output signal $V\alpha$ of such an angular acceleration sensor according to the prior art is plotted as a function of rotational speed $\omega$. From this it can be seen that the output signal of the sensor drops by 3 dB as early as at a rotational speed range of approximately 3000 to 3500 rpm. This characteristic response to the rotational speed of DC Ferraris sensors can be ascribed first to dissipation in the disk, which leads to heating of the disk, and second, to the eddy-current field, which acts in a compensating fashion on the applied DC magnetic field at a relatively high rotational speed.

Based on an extrapolation of the prior art, it would seem possible to avoid this undesired effect by using either the design of the sensor or electronic linearization, for example, to amplify the amplitude of the sensor signal as a function of the working point, to linearize the sensitivity. A drop of 3 dB in the useful signal can be displaced by higher rotational speeds by the design of the sensor, for example by skillful selection of the material of the disk, the applied magnetic field, and of the gap between head and disk. But these design choices result in a loss of sensitivity.

Linearizing in an electronic way could also be performed by post-amplification of the acceleration signal as a function of rotational speed. However, this requires knowledge of the sensitivity characteristic relative to rotational speed, and of the rotational speed itself. Moreover, interference such as noise is also amplified, and this leads to a smaller signal-to-noise ratio at higher rotational speeds.

SUMMARY OF THE INVENTION

The object of the present invention is therefore to develop a Ferraris sensor having evaluation electronics such that the sensor is upgraded for a substantially larger rotational speed range than has previously been known from the prior art, and losses with regard to the sensitivity and the signal-to-noise ratio are kept as low as possible.

To achieve this object, the invention makes use of a Ferraris sensor having advantages over those known in the prior art, by developing the acceleration sensor having an evaluating circuit arrangement by means of an additional DC magnetic field excitation circuit with a means for driving the latter to cause the additional DC magnetic field to act in a compensating fashion on an eddy-current field, starting from a relatively high rotational speed of the Ferraris disk. This is achieved for example, by virtue of the fact that the additional DC magnetic field excitation circuit comprises a means for generating a direct current which is proportional to a control signal dependent on the rotational speed of the Ferraris disk and which flows through an operating coil which supplies the additional compensating DC magnetic field. It is preferred for the operating coil to be arranged in such a way that the additional compensating DC magnetic field can be coupled in and onto the Ferraris disk in the region of the inductive measuring head.

The aformentioned disadvantages of the prior art are successfully avoided as a consequence of the compensation of the drop in sensitivity by an additional DC magnetic field excitation circuit and the means, required therefore, for driving in accordance with the invention. The excitation circuit includes a means for generating current which generates a direct current which is proportional to a control signal, and an operating coil through which the direct current flows and which generates a magnetic field which is coupled in onto the disk in the region of the head and acts in a compensating fashion on the DC eddy-current field.

Two types of generation of the control signal dependent on rotational speed are proposed:

generating of the control signal outside the acceleration sensor; and obtaining the control signal from variables of the acceleration sensor.

If the control signal is generated outside the acceleration sensor, the excitation circuit then functions as a compensation circuit without a regulating effect.

In a preferred embodiment of the evaluation circuit according to the present invention, the operating coil can be used to amplify the main magnetic field between the inductive measuring head and the Ferraris disk in a fashion proportional to the control signal dependent on rotational speed. In this case, it has proved to be favorable when a suitable characteristic curve is used to relate the rotational speed of the Ferraris disk to the control signal.

In another preferred embodiment of the present invention, the eddy-current DC field can be reduced in a fashion proportional to the control signal, dependent on rotational speed, by means of the operating coil. If the control signal for driving the operating coil is not generated in the sensor itself, but outside it, it is possible to distinguish thereby, fundamentally, two advantageous design types. First, the operating coil acts in the direction of the main field. For the purpose of compensating the drop in sensitivity, the main field is additionally amplified in a fashion proportional to the control signal with the aid of the operating coil. The control signal is combined with a signal, for example the rotational speed, fed from the outside. The combination is performed via a characteristic curve. If the profile of the sensitivity against rotational speed is known, the main field can be amplified with the aid of the characteristic curve in a fashion inverse to the sensitivity as a function of rotational speed. The drop in sensitivity toward higher rotational speeds is thereby compensated. The main field can be generated in this case by a permanent magnet or solely by the operating coil or with the aid of a further operating coil.

Second, the operating coil acts in the direction of the eddy-current field. The actual cause of the drop in sensitivity is the eddy-current field. In order to counteract this the eddy-current DC field is compensated directly with the aid of a suitably fitted winding. The control signal is combined with the rotational speed, for example via a proportionality factor. Since the eddy-current DC field is proportional to the rotational speed and the compensation field is then set in a fashion proportional to the rotational speed, this leads to compensation of the eddy-current field, and this linearizes the sensor. The compensation need not be exact, because the sensitivity around the rotational speed of zero is constant over a certain range. The compensation need merely ensure that the linear range is not left. The main field can be generated in this case as well by a permanent magnet or with the aid of a further operating coil. The losses in the case of higher rotational speeds are greater than without compensation, but smaller than in the case of the previously described compensation by increasing the main field.

If the control signal is generated from variables in the sensor, the functional chain closes to form a control loop. In accordance with the present invention, two types of control loop are proposed in this case:

- a control loop which for the purpose of generating the control signal uses the signal of the acceleration sensor through subsequent integration; and
- a control loop which, for the purpose of generating the control signal, uses an additional magnetic field sensor, for example a Hall sensor or an XMR sensor.

According to a further preferred embodiment of the present invention, the additional DC magnetic field excitation circuit forms a control loop with the sensor by virtue of the fact that the control signal dependent on rotational speed can be generated from the acceleration-dependent variable of the sensor. This can be implemented particularly easily and effectively by virtue of the fact that the control signal, dependent on rotational speed, can be generated by an integrator by means of integrating the acceleration-dependent variable.

A further preferred embodiment of the evaluation circuit in accordance with the present invention therefore obtains the control signal, dependent on rotational speed, through a further magnetic field sensor from the magnetic field of the acceleration sensor, in particular from the field in the eddy. It is thereby possible by measuring the field and using a regulating device to regulate the field in the eddy to a specific value (for example zero), and thus to avoid a drop in sensitivity.

Yet a further preferred embodiment makes use, (in addition to the magnetic field sensor), of a detector coil for detecting a voltage induced by the magnetic field of the acceleration sensor, in particular the field in the eddy.

An alternative design of the evaluation circuit of the present invention dispenses with the additional detector coil by virtue of the fact that a variable which is proportional to a voltage induced by the magnetic field of the acceleration sensor, in particular the field in the eddy, can be generated by a means for differentiation of this magnetic field. By virtue of the fact that a determined compensating direct current applies a low-frequency component of the acceleration, and the voltage (Uind) induced by the magnetic field of the acceleration sensor, in particular the field in the eddy, (or the variable proportional thereto which supplies a high-frequency component of the acceleration), the two signals can be combined to form a broadband acceleration signal. By adding the measured value of the magnetic field sensor to the compensation current, it is also possible, however, to determine a broadband value proportional to the rotational speed.

Such an acceleration sensor using the Ferraris principle and with an evaluation circuit according to the invention can be used particularly advantageously in a numerically controlled machine tool, a robot or the like. Further advantages and details of the invention will be apparent for the detailed description below and in conjunction with the drawing in which:

DETAILED DESCRIPTION OF THE INVENTION

Figure 1:
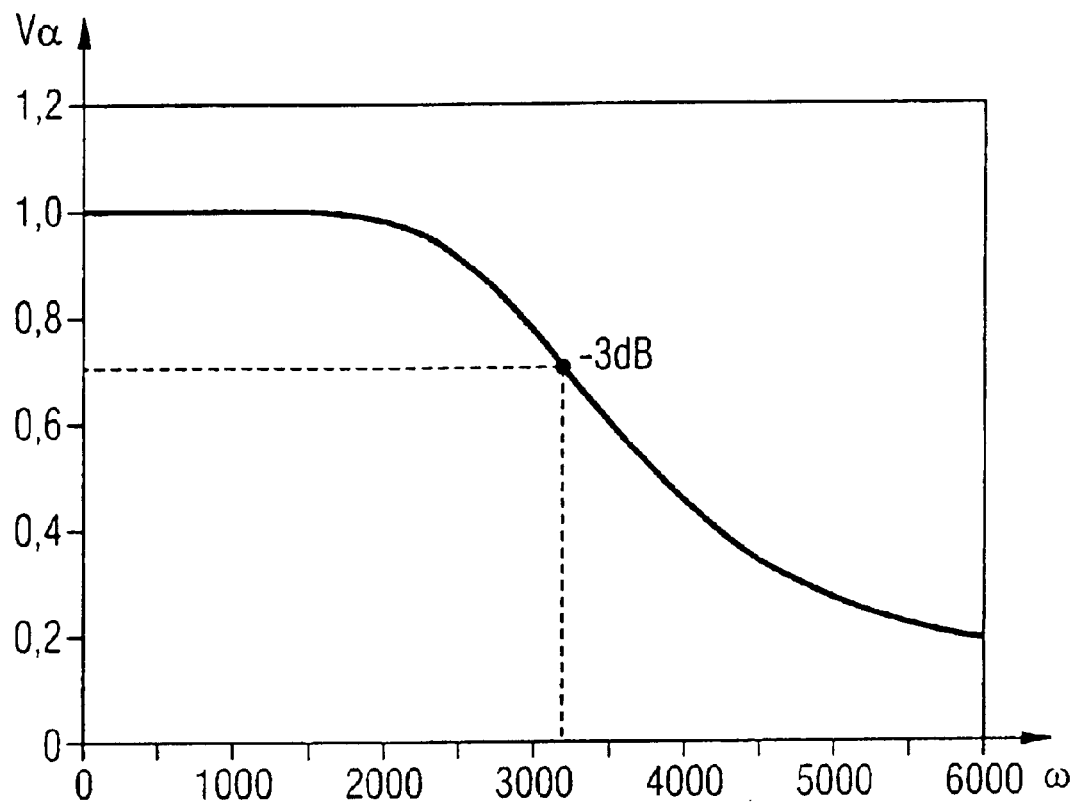
FIG. 1 shows a typical sensitivity profile of a Ferraris acceleration sensor according to the prior art.
Figure 2:
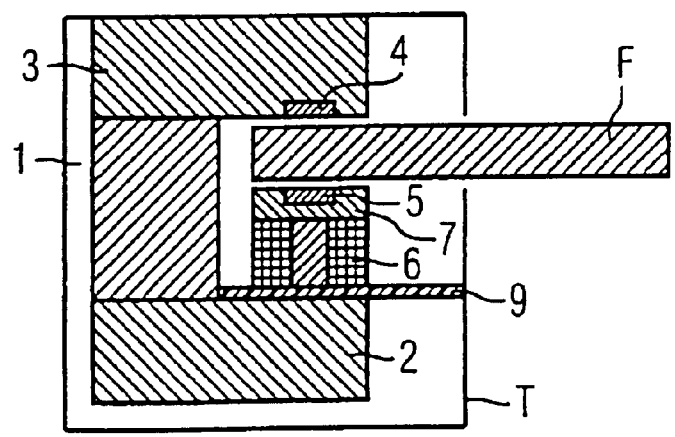
FIG. 2 shows a side view of a known measuring head of an acceleration sensor using the Ferraris principle.
Figure 3:
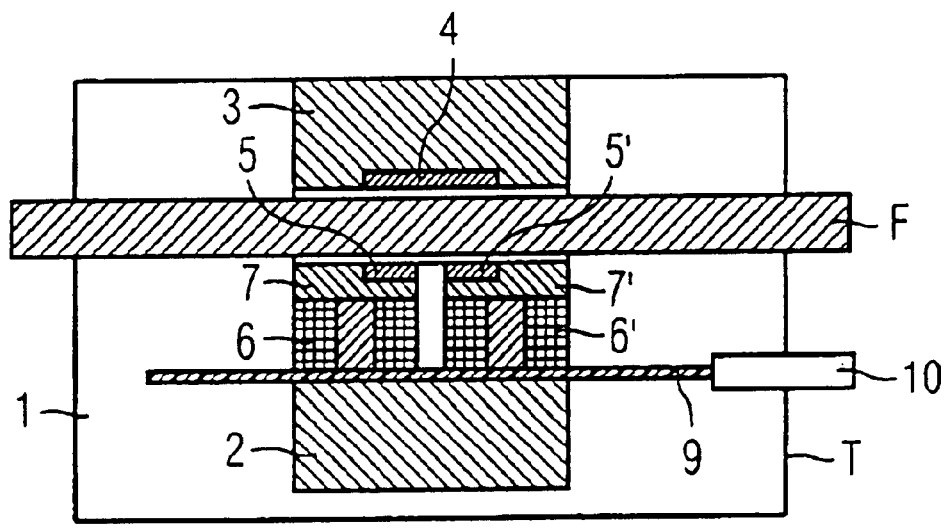
FIG. 3 shows a front view of a known measuring head of an acceleration sensor using the Ferraris principle.

FIG. 1 has been explained herein above. FIG. 2 and FIG. 3 show, by way of example, a known measuring head T of an acceleration sensor using the Ferraris principle, in a side view (FIG. 2) and a corresponding front view (FIG. 3).

The measuring head or probe T is constructed on an installation sheet or in a housing 1 and has a detector-side flux-guiding structure 2 and a flux-guiding structure 3 on the side of the Ferraris disk for the magnetic flux, which describe a cross section in the shape of a horseshoe. The flux guidance structure 3 has a first permanent magnet 4. Two detector coils 6 and 6' arranged in parallel and having a respective core are fitted to the other flux guidance structure 2 at the open end of the cross section in the shape of a horseshoe on a coil plate 9. Fitted on the latter, in turn, in each case is a flux guidance structure 7 and 7' with respective permanent magnets 5, this being done such that the permanent magnets 4 and 5 are situated opposite one another and remaining free therebetween is an air gap in which the Ferraris disk F engages. The coil plate 9 has a cable connector 10 for electric connection of, for example, an evaluation circuit.

Figure 4:
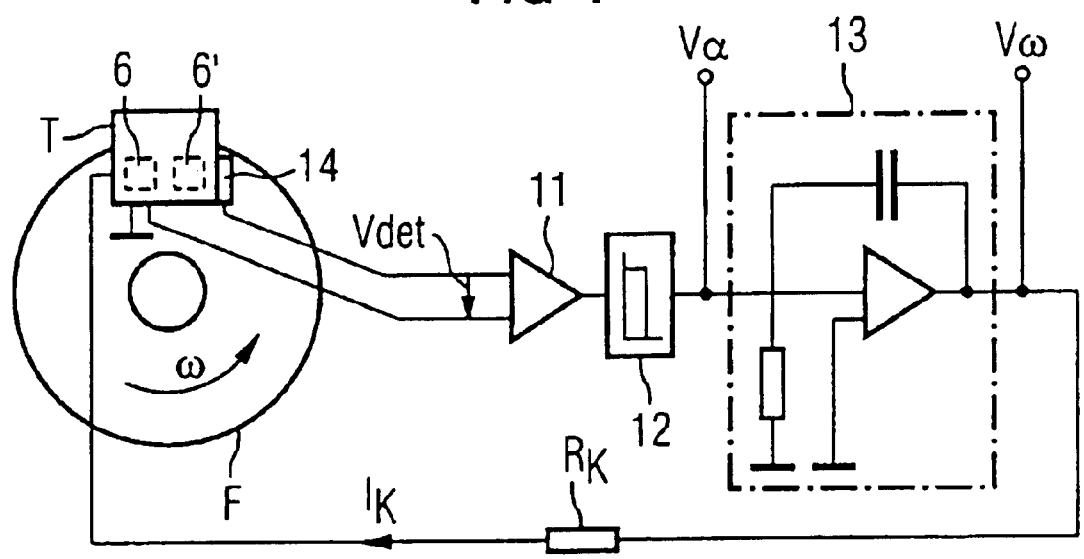
FIG. 4 shows the principle of a control loop with the control signal being obtained from a variable of the acceleration sensor.

On the basis of such an arrangement of measuring head T, and Ferraris disk F, FIG. 4 shows a first exemplary embodiment of the invention with a control loop, and the acceleration sensor is used to determine the additional DC magnetic field for compensation purposes. Obtaining a control signal from a variable of the acceleration sensor T, 6, 6', F is performed in this case using the principles whereby an acceleration signal Vdet is detected via the detector coils 6 and 6' and is amplified in an amplifier device 11, and filtered with the aid of a filter device 12 and then released as useful signal Vα for regulating, for example, drive connected to the rotatable Ferraris disk.

Subsequently, the useful signal Vα is integrated by a downstream integrator circuit 13, the result being a voltage Vω which is proportional to the rotational speed ω. The voltage Vω is subsequently applied to a series circuit composed of a resistive component $R_K$ and an inductive component, and an operating coil or compensation coil 14 preferably arranged in the region of the measuring head T, which thus leads to a current $I_K$ which is proportional to the rotational speed ω. In this way, the current $I_K$ generates in the region of the measuring head T an additional magnetic field which is proportional to the rotational speed ω and counteracts the undesired DC eddy-current field. A precondition for this is that it is ensured by the winding of the compensation coil 14 or by the polarity of the voltage Vα (for example via an inverter) that the polarity of the compensation field is opposite to that of the eddy-current field.

Figure 5:
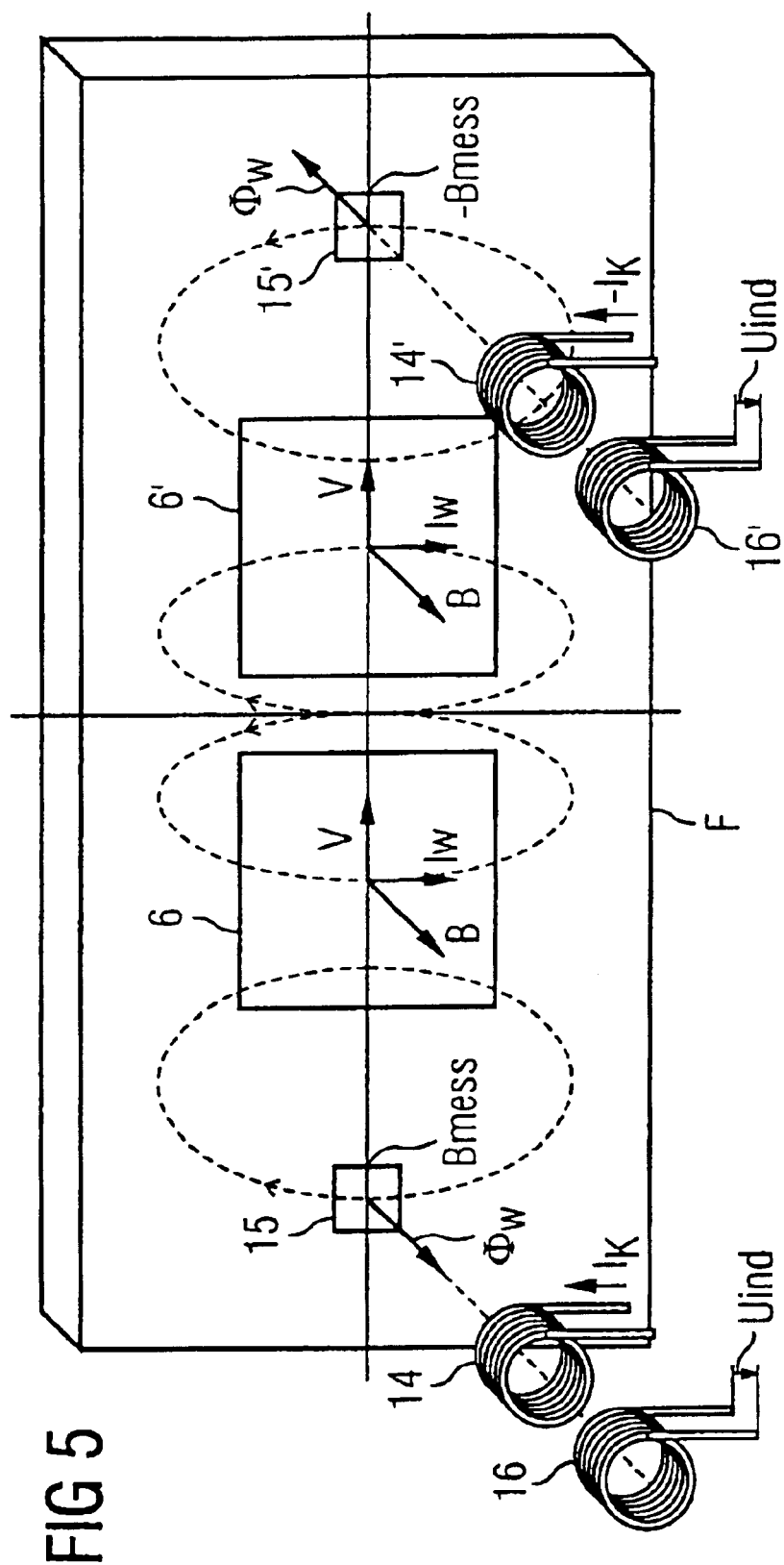
FIG. 5 shows an arrangement of a magnetic field sensor with a detector coil and a compensation winding in accordance with the invention.

Another preferred embodiment of the present invention, which is illustrated in FIG. 5, detects the magnetic field in accordance with the invention with the aid of an additional measuring device 15 in the acceleration sensor T, F. This can be, for example, the field Bmess in the eddy. Via a suitably fitted winding 14 for compensating the eddy-current DC field, the compensation current $I_K$ is set such that the field at the measuring point Bmess of the measuring instrument 15 assumes a prescribable value such as, for example, zero. The compensation current $I_K$ required therefor is determined in this case by a regulation explained in more detail below.

FIG. 5 illustrates a corresponding arrangement having a measuring instrument for the field +Bmess and −Bmess, specifically magnetic field sensors 15, 15', and compensation windings 14, 14', as well as detector coils 16, 16' for detecting an induced voltage Uind. The profile of the eddy current $I_W$ in the Ferraris disk F, which rotates with a speed v, is shown, as is the magnetic field B produced by the eddy current. The respective magnetic flux $\Phi_W$ induced by the eddy current $I_W$ is now detected at the two measuring points +Bmess and −Bmess with the aid of the magnetic field sensors 15 and 15', which are provided in twofold fashion by analogy with the coils 6 and 6' of the measuring head T. The appropriately assigned compensation windings 14, 14' and the two detector coils 16, 16' are now arranged in the direction of flux on the respective axis of the induced magnetic flux $\Phi_W$ such that the eddy-current DC field can be influenced by the compensation windings 14, 14' to which the compensation current $I_K$ or $-I_K$ is applied, and an induced voltage Uind can be detected by the detector coils 16, 16', being dimensioned in accordance with the equation:

$$U\text{ind}=k^*N^*(d\Phi_W/dt) \quad (1)$$

Figure 6:
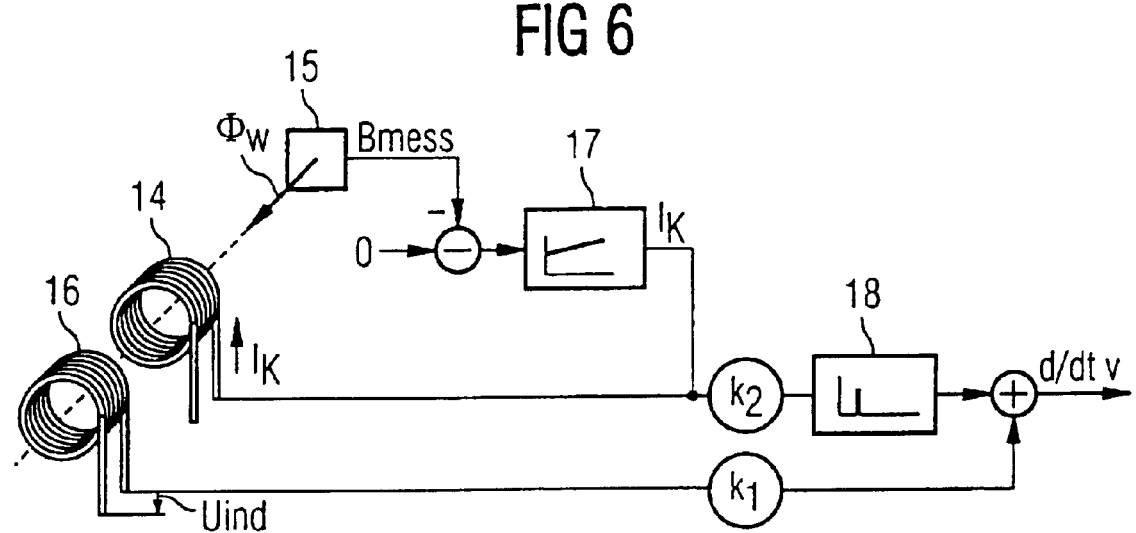
FIG. 6 shows the principle of a control loop for regulating a compensation current and evaluating the acceleration, based on an arrangement according to FIG. 5.

The regulating device can be configured in this case in various forms. In a first variant, which is shown in FIG. 6, the measuring instrument 15, 15' is for the field Bmess (magnetic field sensor) and the detector coils (16 or 16') is for detecting the induced voltage Uind are used to generate the sensor signal dv/dt. In the second variant, shown in FIG. 7, it is even possible to dispense with detector coils 16, 16' for detecting the induced voltage Uind.

In accordance with the first variant (FIG. 6), it holds that the magnetomotor force is:

$$\Phi_W=k_W{}^*L_W{}^*I_W-k_K{}^*L_K{}^*I_K, \quad (2)$$

where $L_K$ is the inductance of the compensation coil 14, and $L_W$ is the eddy-current inductance.

It holds for the measured field that:

$$B\text{mess}=k_m{}^*\Phi_W \quad (3)$$

The calculating rule (1) set forth above holds for the induced voltage. It holds for the relationship between the speed v of the Ferraris disk F and the eddy current $I_W$ that:

$$I_W=v^*B^*W/R_w, \quad (4)$$

with $R_W$ as the eddy-current resistance.

The equation (4) can now be used to derive by differentiation:

$$d/dtv=R_W/(B^*W)d/dt\,I_W$$

With the aid of equation (2), this becomes:

$$d/dtv=R_W/(B^*W)^*(d/dt\Phi_W+k_K{}^*L_K ddI_K)/(k_W{}^*L_W) \quad (5)$$

With the aid of equation (1), equation (5) yields:

$$d/dtv=R_W/(B^*W^*k_W{}^*L_W)^*(U\text{ind}/(k^*N)+k_K d/dtI_K)$$

or in a simplified version:

$$d/dtv=k_1{}^*U\text{ind}+k_2 d/dtI_K \quad (6).$$

According to the present invention, the arrangement shown in FIG. 6, which is explained below, serves in accordance with this variant for the purpose of regulating the field Bmess and evaluating equation (6).

What is shown in FIG. 6 is the principle of the electric regulation with the aid of which the components 14 to 16 are driven or evaluated in order to regulate the compensation current and evaluate the acceleration. The compensation current $I_K$ is determined from the difference, −, of the value $\Phi_W$, determined by the magnetic field sensor 15, in Bmess, and the value zero by an PI controller 17, which is fed into the compensation winding 14. Furthermore, the value $I_K$ is weighted with a factor $k_2$ and differentiated in a means 18. Subsequently, an acceleration-dependent variable d/dt v (acceleration value as derivative of speed v with respect to time t) is determined in accordance with equation (6) from the value obtained in the process by its addition "+" to the induced voltage Uind weighted with the factor $k_1$, and determined by the detector coil 16.

The objective is to obtain an acceleration signal at the Ferraris sensor with as broad a band as possible. Particularly in case of slow compensation regulation, the desired broadband nature is not provided simply by evaluating the compensation current. In the arrangements according to FIG. 6 and FIG. 7, which are explained below, the signal $I_K$ includes the low-frequency component and Bmess includes the high-frequency component of the acceleration d/dt, v or the rotational speed v or ω itself. The desired broadband signal for the acceleration is then obtained by combining these two variables.

If the regulation is slow, then, Bmess is regulated to zero in a stationary fashion, and a field which induces a voltage Uind is produced dynamically. The compensation current $I_K$ is built up with the dynamics of the regulation and can be effectively differentiated. The dynamic component is included in Uind. Taken together, these two produce the acceleration signal (which is correct in stationary and dynamic terms).

If, by contrast, the regulation is very fast, Bmess also vanishes identically in a dynamic fashion. According to the calculation rule (3), it is also the case that $\Phi_W=0$ dynamically, and thus that the induced voltage Uind=0. In that case, the branch with Uind and $k_1$, can be eliminated. The input of the differentiator 18 then also corresponds to the speed ω in stationary and dynamic terms.

The foregoing holds correspondingly for the negative regulation branch with the elements 14', 15' and 16' as shown in FIG. 5, but taking into account the corresponding change in sign. Furthermore, using equation (3) the following may be determined from the calculation rule (5):

$$d/dtv = R_W/(B*W)*(d/dt\ Bmess/k_m + k_K*L_K d/dtI_K)/(k_W*L_W),$$

or in simplified terms:

$$d/dtv = k_3 d/dt\ Bmess + k_2 d/dtI_K \qquad (7)$$

In accordance with equation (7), it is therefore possible according to the present invention, to eliminate even the detector coil 16 used in the variant according to FIG. 6. Instead of this, Bmess is differentiated in a further means 19 and, weighted with $k_3$, further processed to form a signal 20 proportional to the induced voltage Uind.

Figure 7:
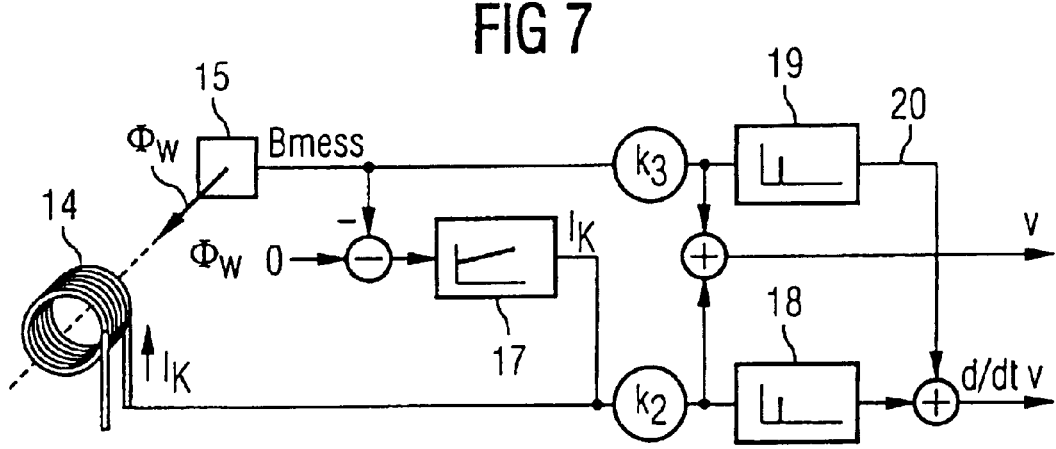
FIG. 7 shows a the principle of a control loop for regulating a compensation current and evaluating the acceleration as in FIG. 6, but without detector coil.

The illustration according to FIG. 7 shows such an arrangement, similar to FIG. 6, for regulating the compensation current $I_K$ and evaluating the acceleration. Exactly as described in the case of FIG. 6, the compensation current $I_K$ is regulated via the PI controller 17 and further processed via the factor $k_2$ and the differentiator 18. Adding "+" this signal to signal 20 produces the acceleration-dependent variable d/dt v (acceleration value as derivative of the speed v with respect to time t) in accordance with equation (7).

In addition, a broadband speed value v can be determined by adding "+" Bmess weighted with $k_3$ and the compensation current $I_K$ weighted with $k_2$.

If the regulation is, in turn, slow, the branch via $I_K$ supplies the stationary component, and that via Bmess the dynamic component of the acceleration value.

Of course, as an alternative to the embodiment shown in FIG. 7 it is also possible first to add and then differentiate (only once). One of the differentiators 18 or 19 thereby becomes dispensable. The rotational speed signal v or ω (correct in stationary and dynamic terms) is present before the differentiation. If, in turn, the regulation is very fast, Bmess also vanishes identically in a dynamic fashion. The corresponding branch supplies zero, and can then be eliminated.

The losses in the case of relatively high rotational speeds are certainly greater according to this principle than without compensation according to the invention, but smaller than in the case of compensation by increasing the main field. They are identical to the case of the controlled compensation.

Of course, with knowledge of the above the person skilled in the art can design further advantageous embodiments depending on requirements, but these are all based on the principle of compensating the eddy-current DC field according to the invention.

We claim:

1. A circuit configuration for evaluating an acceleration sensor according to the Ferraris principle, comprising an inductive measurement head that interacts with a movable Ferraris disk, essentially via a main magneticizing field, and which supplies a variable that is dependent on acceleration, further comprising a direct-current magnetic field excitation circuit having a control loop to cause a direct-current magnetic field to act compensatingly on an eddy-current field occurring from a higher rotational speed of the Ferraris disk wherein the direct-current magnetic field excitation circuit controls compensation windings by a direct current, further comprising a magnetic field sensor provided for measurement of a magnetic field in the sensor, said sensor outputting a signal for regulating the direct current through the compensation windings.

2. The circuit according to claim 1, wherein the magnetic field sensor is configured as a Hall sensor or XMR sensor.

3. The circuit according to claim 1, wherein, by means of the measurement of the magnetic field sensor the eddy-current field is regulable to a preassignable value, including zero.

4. The circuit according to claim 1, further comprising a detector coil to detect a voltage induced by the magnetic field in the acceleration sensor, including the eddy-current field.

5. The circuit according to claim 1, wherein, a variable proportional to a voltage induced by the magnetic field in the acceleration sensor, in particular from the eddy-current field, is generated by a means of differentiating the measured magnetic field.

6. The circuit according to claims 4 or 5, wherein the direct current yields a low-frequency component of the acceleration, and the voltage induced by the magnetic field in the acceleration sensor, in particular from the field in the eddy, or the variable proportional to the voltage, yields a high-frequency component of the acceleration, and the direct current and the induced voltage or the variable proportional to the voltage are combinable to a broad-band acceleration signal.

7. The circuit according to claim 3, wherein, by addition of a measured value of the magnetic field sensor to the compensation current, a broad-band value proportional to the rotational speed is determinable.

8. A digitally controlled machine tool, comprising an acceleration sensor according to the Ferraris principle, and an evaluating circuit according to claim 1.

9. A arrangement for evaluating an acceleration according to the Ferraris principle, comprising:
an inductive measurement head that interacts with a movable Ferraris disk, essentially via a main magneticizing field, and which generates a first signal that is dependent on acceleration of the Ferraris disk,
a magnetic field sensor for measuring a magnetic field in the inductive measurement head,
an evaluation circuit coupled with the magnetic field sensor for providing the first signal,
compensation windings arranged in the area of the inductive measurement head for providing a compensating magnetic field which can compensate an eddy-current field occurring from a higher rotational speed of the Ferraris disk,
an excitation circuit receiving the first signal and generating a second signal fed to the compensation windings for generating the compensating magnetic field.

10. The circuit according to claim 9, wherein the magnetic field sensor is configured as a Hall sensor or XMR sensor.

11. The circuit according to claim 9, wherein the compensating magnetic field compensates the eddy-current field to a preassignable value, including zero.

12. The circuit according to claim 9, further comprising a second sensor to detect a voltage induced by the eddy-current field.

13. The circuit according to claim 12, further comprising a differentiator for differentiating the second signal and an adder for adding the voltage weighted by a factor to the differentiated second signal.

14. The circuit according to claim 9, further comprising a first differentiator for differentiating the first signal and a second differentiator for differentiating the second signal, and an adder for adding the differentiated first and second signal.

15. The circuit according to claim 14, wherein the first signal is weighted by a first factor before it is differentiated and the second signal is weighted by a second factor before it is differentiated.

16. The circuit according to claim 15, further comprising a second adder for adding the first signal weighted by the first factor and the second signal weighted by the second factor.

* * * * *